United States Patent
Whitt et al.

(10) Patent No.: US 11,400,830 B2
(45) Date of Patent: Aug. 2, 2022

(54) SYSTEMS AND METHODS FOR ROUTING PERSONAL MOBILITY VEHICLES BASED ON ROAD CONDITIONS

(71) Applicant: Lyft, Inc., San Francisco, CA (US)

(72) Inventors: Carlos Ellis Whitt, San Francisco, CA (US); Steven James Martisauskas, San Francisco, CA (US); Dor Levi, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 349 days.

(21) Appl. No.: 16/235,699

(22) Filed: Dec. 28, 2018

(65) Prior Publication Data

US 2019/0376805 A1    Dec. 12, 2019

(51) Int. Cl.
*G01C 21/34* (2006.01)
*B60L 58/13* (2019.01)
(Continued)

(52) U.S. Cl.
CPC .............. *B60L 58/13* (2019.02); *B60Q 1/346* (2013.01); *B60Q 1/444* (2013.01); *B60R 25/245* (2013.01);
(Continued)

(58) Field of Classification Search
CPC ......... B60L 58/13; B60Q 1/346; B60Q 1/444; G01C 21/3423; G01C 21/3415;
(Continued)

(56) References Cited

U.S. PATENT DOCUMENTS

| 10,584,971 | B1 * | 3/2020 | Askeland | ............... G01C 21/30 |
| 2003/0177062 | A1 | 9/2003 | Chen | |

(Continued)

FOREIGN PATENT DOCUMENTS

| CN | 104217583 A | 12/2014 |
| EP | 2 573 720 A1 | 3/2013 |

(Continued)

OTHER PUBLICATIONS

Whitt et al., "Systems and Methods for Matching Transportation Requests to Personal Mobility Vehicles", U.S. Appl. No. 16/207,002, filed Nov. 30, 2018, 83 pages.

(Continued)

*Primary Examiner* — Nadeem Odeh
(74) *Attorney, Agent, or Firm* — Baker Botts L.L.P.

(57) ABSTRACT

The disclosed computer-implemented method may include routing personal mobility vehicles based on road or path conditions. In some embodiments, trip routing for personal mobility vehicles participating in a dynamic transportation network may leverage road condition map data gathered from personal mobility vehicle sensors to evaluate potential routes for personal mobility vehicles. In some examples, the method may account for the type and/or characteristics of the personal mobility vehicle when evaluating a potential route. In some examples, the method may account for user preferences when evaluating a potential route. The method may also make matching decisions for a dynamic transportation matching system and/or personal mobility vehicle distribution decisions for the dynamic transportation network based on the conditions of prospective routes. Various other methods, systems, and computer-readable media are also disclosed.

20 Claims, 12 Drawing Sheets

(51) Int. Cl.
| | |
|---|---|
| G07C 5/00 | (2006.01) |
| G06Q 10/02 | (2012.01) |
| G06Q 50/30 | (2012.01) |
| B60Q 1/34 | (2006.01) |
| B60Q 1/44 | (2006.01) |
| B60W 10/08 | (2006.01) |
| B60W 10/18 | (2012.01) |
| B60W 10/20 | (2006.01) |
| B60W 10/30 | (2006.01) |
| B60W 50/12 | (2012.01) |
| G08G 1/16 | (2006.01) |
| G08G 1/01 | (2006.01) |
| G01C 21/20 | (2006.01) |
| H04W 4/029 | (2018.01) |
| H04W 4/40 | (2018.01) |
| B60R 25/24 | (2013.01) |
| G06V 20/56 | (2022.01) |

(52) U.S. Cl.
CPC ............ *B60W 10/08* (2013.01); *B60W 10/18* (2013.01); *B60W 10/20* (2013.01); *B60W 10/30* (2013.01); *B60W 50/12* (2013.01); *G01C 21/20* (2013.01); *G01C 21/3415* (2013.01); *G01C 21/3423* (2013.01); *G01C 21/3438* (2013.01); *G01C 21/3461* (2013.01); *G01C 21/3492* (2013.01); *G06Q 10/02* (2013.01); *G06Q 50/30* (2013.01); *G06V 20/588* (2022.01); *G07C 5/004* (2013.01); *G07C 5/008* (2013.01); *G08G 1/0125* (2013.01); *G08G 1/163* (2013.01); *G08G 1/165* (2013.01); *H04W 4/029* (2018.02); *H04W 4/40* (2018.02); *B60R 2325/205* (2013.01); *B60W 2300/365* (2013.01); *B60W 2510/244* (2013.01); *B60W 2552/00* (2020.02); *B60W 2552/15* (2020.02); *B60W 2710/086* (2013.01); *B60W 2710/18* (2013.01); *B60W 2710/20* (2013.01); *B60W 2710/30* (2013.01); *B60W 2720/10* (2013.01); *B62K 2202/00* (2013.01)

(58) Field of Classification Search
CPC ............ G01C 21/3461; G01C 21/3438; G01C 21/3492; G01C 21/20; G06K 9/00798; G06K 9/00791; B60W 10/08; B60W 10/18; B60W 10/20; B60W 10/30; B60W 50/12; B60W 2552/00; B60W 2552/15; B60W 2300/365; B60W 2510/244; B60W 2710/086; B60W 2710/18; B60W 2710/20; B60W 2710/30; B60W 2720/10; G08G 1/163; G08G 1/165; G08G 1/0125; G08G 1/205; G08G 1/0141; H04W 4/029; H04W 4/40; B60R 25/245; B60R 2325/205; G07C 5/004; G07C 5/008; G06Q 10/02; G06Q 50/30; B62K 2202/00; Y02T 10/70
See application file for complete search history.

(56) References Cited

U.S. PATENT DOCUMENTS

| | | | |
|---|---|---|---|
| 2008/0122605 A1 | 5/2008 | Tengler et al. | |
| 2010/0036599 A1* | 2/2010 | Froeberg | G01C 21/3461 701/532 |
| 2010/0042314 A1* | 2/2010 | Vogt | G01C 21/3484 701/532 |
| 2011/0133918 A1 | 6/2011 | Lee et al. | |
| 2012/0143401 A1 | 6/2012 | Jayadevappa et al. | |
| 2012/0232787 A1* | 9/2012 | Kunath | G01C 21/3697 701/423 |
| 2013/0046456 A1 | 2/2013 | Scofield et al. | |
| 2013/0173146 A1 | 7/2013 | Atmur et al. | |
| 2014/0074392 A1* | 3/2014 | Holm | G01C 21/3415 701/400 |
| 2015/0074004 A1 | 3/2015 | Song | |
| 2015/0092056 A1 | 4/2015 | Rau et al. | |
| 2015/0305426 A1 | 10/2015 | Lee et al. | |
| 2016/0069696 A1 | 3/2016 | Salowitz | |
| 2016/0131492 A1 | 5/2016 | Sheha et al. | |
| 2016/0306350 A1 | 10/2016 | Shim et al. | |
| 2016/0320198 A1* | 11/2016 | Liu | G01C 21/3438 |
| 2017/0030728 A1 | 2/2017 | Baglino et al. | |
| 2017/0053209 A1* | 2/2017 | Ceret | G01C 21/343 |
| 2017/0191845 A1 | 7/2017 | Marueli et al. | |
| 2017/0225742 A1* | 8/2017 | Hancock | B60W 30/188 |
| 2017/0236415 A1 | 8/2017 | Okabe et al. | |
| 2017/0243492 A1 | 8/2017 | Lambert et al. | |
| 2017/0314945 A1* | 11/2017 | Konig | G01C 21/3461 |
| 2017/0328725 A1* | 11/2017 | Schlesinger | G01C 21/3484 |
| 2017/0364995 A1 | 12/2017 | Yan | |
| 2018/0010915 A1* | 1/2018 | Wilhelm | G05D 1/0297 |
| 2018/0018840 A1 | 1/2018 | Xia et al. | |
| 2018/0094943 A1* | 4/2018 | Grochocki, Jr. | G01C 21/3484 |
| 2018/0096445 A1 | 4/2018 | Eyler et al. | |
| 2018/0114258 A1 | 4/2018 | Ross et al. | |
| 2019/0178672 A1* | 6/2019 | Woolley | G01C 21/3415 |
| 2019/0383627 A1* | 12/2019 | Nangeroni | B60W 50/0098 |
| 2020/0064147 A1* | 2/2020 | Sliney | G01C 21/3492 |
| 2020/0151611 A1* | 5/2020 | McGavran | G06N 20/00 |
| 2020/0276990 A1* | 9/2020 | Lequio | G07F 17/0057 |

FOREIGN PATENT DOCUMENTS

| | | |
|---|---|---|
| EP | 3 188 141 A1 | 7/2017 |
| JP | 2008-037167 A | 2/2008 |
| JP | 2015-060452 A | 3/2015 |
| KR | 97-69562 A | 11/1997 |
| KR | 10-2012-0092361 A | 8/2012 |
| WO | 2017/194416 A1 | 11/2017 |
| WO | 2018/079590 A1 | 5/2018 |

OTHER PUBLICATIONS

Whitt et al., "Systems and Methods for Determining Allocation of Personal Mobility Vehicles", U.S. Appl. No. 16/175,723, filed Oct. 30, 2018, 69 pages.

Whitt et al., "Systems and Methods for Battery-Driven Personal Mobility Vehicle Management in Dynamic Transportation Networks", U.S. Appl. No. 16/179,788, filed Nov. 2, 2018, 68 pages.

Whitt et al., "Apparatuses, Systems, and Methods for Increasing Safety in Personal Mobility Vehicle Operation", U.S. Appl. No. 16/181,325, filed Nov. 5, 2018, 81 pages.

Whitt et al., "Systems and Methods for Transport Completion Using Lane-Constrained Vehicles and Personal Mobility Vehicles", U.S. Appl. No. 16/206,999, filed Nov. 30, 2018, 99 pages.

Whitt et al., "Systems and Methods for Automated Signaling for Networked Personal Mobility Vehicles", U.S. Appl. No. 16/235,707, filed Dec. 28, 2018, 58 pages.

\* cited by examiner

SYSTEMS AND METHODS FOR ROUTING PERSONAL MOBILITY VEHICLES BASED ON ROAD CONDITIONS

CROSS REFERENCE TO RELATED APPLICATION

This application claims the benefit of U.S. Provisional Application No. 62/681,661, filed 6 Jun. 2018, the disclosure of which is incorporated, in its entirety, by this reference.

BACKGROUND

Personal mobility vehicles, such as scooters and bicycles, are a popular means of transportation in urban areas. Increasingly, such vehicles are not individually owned but instead are rented for short trips via mobile applications. In some examples, a dynamic transportation network that includes cars and other lane-constrained vehicles may also include personal mobility vehicles. A dynamic transportation matching system may match a transportation requestor with a personal mobility vehicle from the dynamic transportation network for one leg of a trip or for the entire trip and may, in some examples, direct the user along a specified route. For example, the dynamic transportation matching system may direct the user to traverse a series of roads and/or paths via the personal mobility vehicle in order to efficiently reach the user's destination.

However, not all roads may be equally suitable for personal mobility vehicles. For example, some roads may have poor-quality bicycle lanes (e.g., too narrow or too little buffer between the bike lane and the street), potholes, or other irregularities. Even paths designated for foot traffic and bicycles or scooters may have varying levels of favorable conditions, such as unpaved sections or narrow areas. These and various other factors may impact the safety and comfort associated with the personal mobility vehicle experience. Accordingly, the instant disclosure identifies and addresses a need for additional and improved systems and methods for routing personal mobility vehicles based on road conditions.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
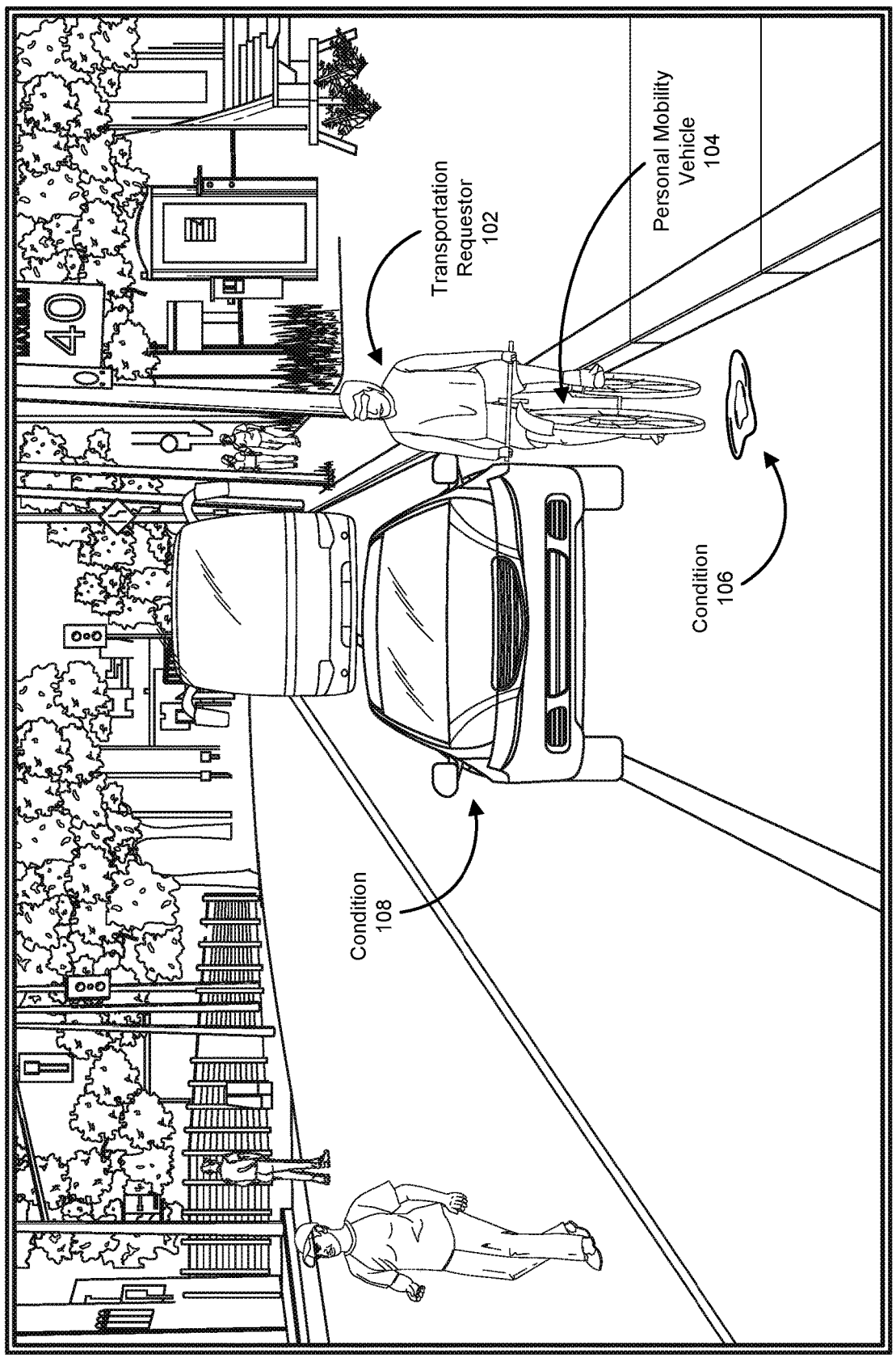
FIG. 1 is an illustration of an example scenario involving a personal mobility vehicle and path conditions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to routing personal mobility vehicles (PMVs) based on road conditions by using data collected from other PMVs participating in the dynamic transportation network to determine conditions on various travel paths and route trips accordingly. Some roads may lack bicycle lanes, have narrow bicycle lanes, be poorly-maintained, and/or have other issues that cause trips on a PMV such as a bicycle or scooter to be less comfortable. Similarly, bicycle paths and other paths may be free from the hazard of collisions with road-going and/or lane-constrained vehicles but may have unpaved stretches, steep grades, poor lighting, sharp turns, and/or other conditions that are unfavorable to personal mobility vehicles. Conversely, especially well-maintained, smooth, wide, well-lit, and otherwise safe and unobstructed roads and paths may be preferable to some users even when another route is more efficient. Accordingly, trip routing for PMVs that participate in a dynamic transportation network may leverage road condition map data gathered from PMV sensors (e.g., cameras and/or accelerometers) within the dynamic transportation network to evaluate potential routes for PMVs. In some examples, trip routing may account for the type and/or characteristics of the PMV such as size, types of wheels, suspension, clearance, maneuverability, and/or visibility when evaluating a potential route. For example, a bicycle may be capable of handling more varied terrain than a scooter. Additionally or alternatively, trip routing may account for user preferences in terms of things like efficiency versus comfort. By using data gathered from PMV sensors to evaluate path condition and then selecting suitable routes for specific users and vehicles, the systems described herein may improve user safety and overall user experience for trips involving PMVs.

Accordingly, as may be appreciated, the systems and methods described herein may improve the functioning of a computer that facilitates transportation via PMVs. In some embodiments, the computer may be part of a PMV. For example, these systems and methods may improve the functioning of the computer by improving the user experience of a user who is using the PMV equipped with the computer. In another example, the computer may be part of a dynamic transportation matching system and the systems and methods described herein may improve the functioning of the computer by providing the computer with additional data that enables the computer to perform improved routing and/or matching. Furthermore, for the reasons mentioned above and to be discussed in greater detail below, the systems and methods described herein may provide advantages to dynamic transportation management and/or the field of transportation by increasing user comfort, safety, and willingness to be transported by PMVs. In addition, these systems and methods may provide advantages to PMVs that operate as a part of a dynamic transportation network. For example, the systems described herein may reduce the rate of wear on the PMVs (e.g., by routing the PMVs to better-maintained paths) and/or improve the safety of the PMVs (e.g., by routing the PMVs to paths with fewer obstacles and/or reduced risk of collision with other vehicles).

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-constrained vehicles (e.g., cars, light trucks, etc.) that may by size, by practice, and/or by law, be purposed for keeping to a standard road lane. By contrast, a PMV may have the flexibility to occupy bike lanes, walking paths, trails, alleys, and/or other areas that are not a standard road lane. Furthermore, in some examples a PMV may have the flexibility to travel while lane splitting (e.g., occupying an area between standard road lanes amidst lane-constrained traffic), to share a standard road lane abreast with one or more other PMVs, and/or to maneuver through, between, and/or around slow or stopped lane-constrained vehicles in heavy traffic where other lane-constrained vehicles could not maneuver through the heavy traffic. Furthermore, the dynamic transportation network may include personal mobility vehicles including but not limited to bicycles, scooters, electric bicycles, and/or electric scooters. In some embodiments, a dynamic transportation network may include autonomous vehicles (e.g., self-driving cars) that may be capable of operating with little or no input from a human operator.

FIG. 1 illustrates an example scenario involving a PMV and path conditions. As illustrated in FIG. 1, a transportation requestor 102 may use a PMV such as PMV 104 to traverse a route that includes a roadway. In some examples, the road may be affected by a condition 108, where road-going and/or lane-constrained vehicles such as cars and buses are likely to get uncomfortably close to transportation requestor 102 due to the lack of a designated bicycle lane on the road. In one example, the road may also be affected by a condition 106 where obstacles such as puddles, potholes, and/or debris clutter the road. In some examples, a transportation requestor may prefer to avoid roads and/or paths with such conditions, even at the cost of a longer or otherwise less convenient trip. However, in order to provide a transportation requestor with a route that includes more comfortable paths, a dynamic transportation matching system must have access to path condition information about the paths available as potential routes. Access to path condition information may enable a dynamic transportation matching system to make routing decisions that direct transportation requestors to safer and/or more comfortable paths.

Figure 2:
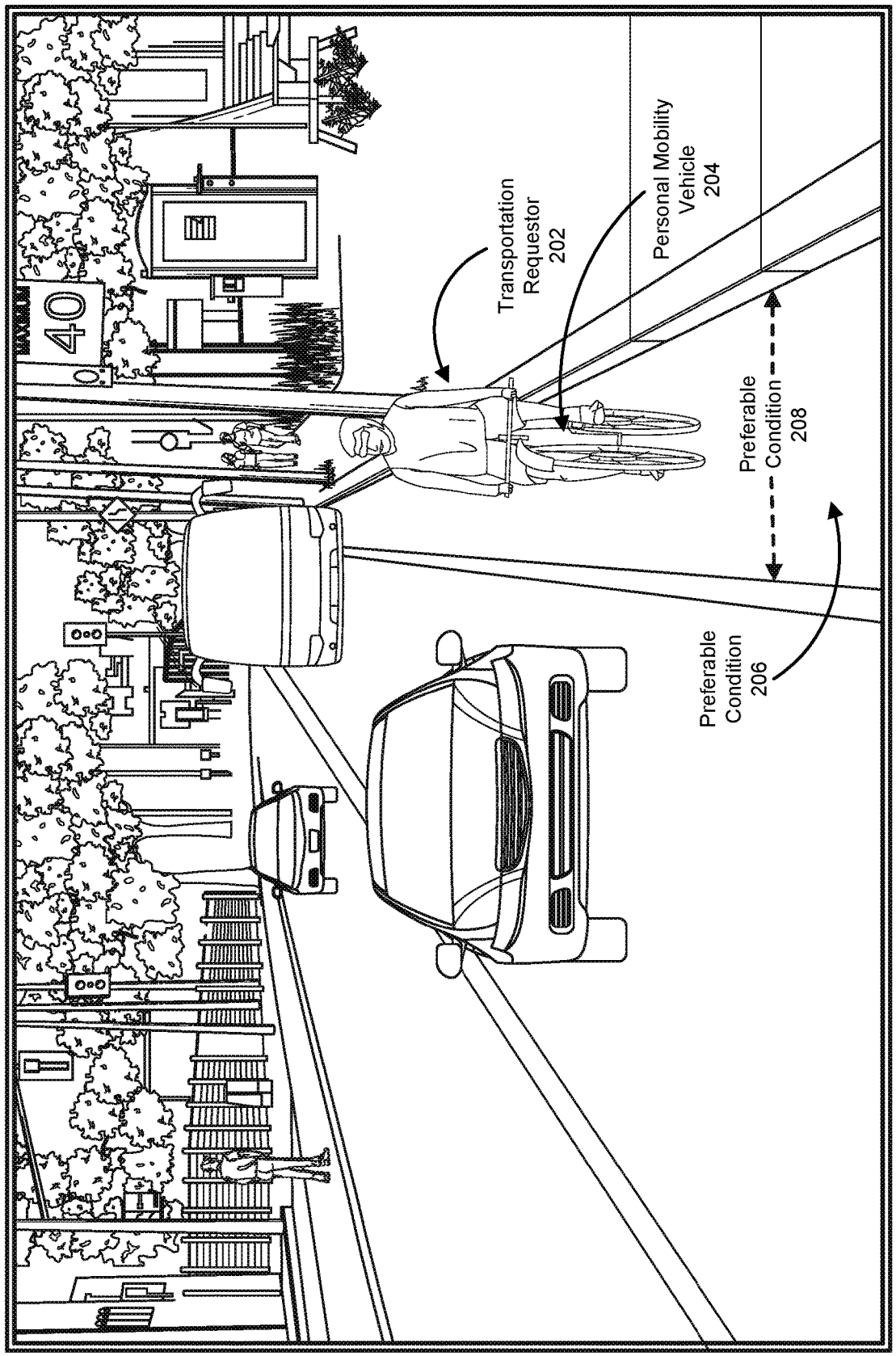
FIG. 2 is an illustration of an additional example scenario involving a personal mobility vehicle and path conditions.

FIG. 2 illustrates an example scenario involving a PMV and preferable path conditions. As illustrated in FIG. 2, a transportation requestor 202 may use a PMV 204 to traverse a road. In some examples, the road may have preferable condition 206, such as a smooth, unobstructed surface that facilitates the safe and comfortable operation of PMV 204. Additionally or alternatively, the road may have preferable condition 208, such as a wide bicycle lane. In some examples, the road may have obstacles between the bicycle lane and a lane designated for lane-constrained vehicles, such as bolsters, a wall, and/or a median, that further improve the safety and/or comfort of the PMV experience.

In some examples, transportation requestor 202 may indicate a preference for the conditions illustrated in FIG. 2 over the conditions illustrated in FIG. 1. In some embodiments, a dynamic transportation matching system may receive explicit transportation requestor preferences as input from a transportation requestor. Additionally or alternatively, a dynamic transportation matching system may infer transportation requestor preferences based on prior transportation requestor behavior (e.g., a pattern of avoiding and/or prioritizing routes with certain conditions). In some examples, the dynamic transportation matching system may infer transportation requestor preferences based on the previous behavior and/or explicit preferences of transportation requestors with similar characteristics (e.g., location, transportation history, age, gender, etc.). In some examples, a transportation requestor may indicate various combinations of preferences. For example, a transportation requestor's stored preferences may indicate a preference for well-lit paths unless a less well-lit path enables the transportation requestor to complete a trip at least ten minutes more quickly, in which case the transportation requestor may prefer the more efficient but less well-lit path. In another example, a transportation requestor's stored preferences may indicate that the transportation requestor prefers to never transit roads that have no bicycle lane regardless of efficiency. In some examples, a transportation requestor's preferences may vary based on the type of PMV available. For example, a transportation requestor may prefer to avoid routes with significant uphill sections while on a manually powered bicycle but may not mind such routes while on an electric scooter.

Figure 3:
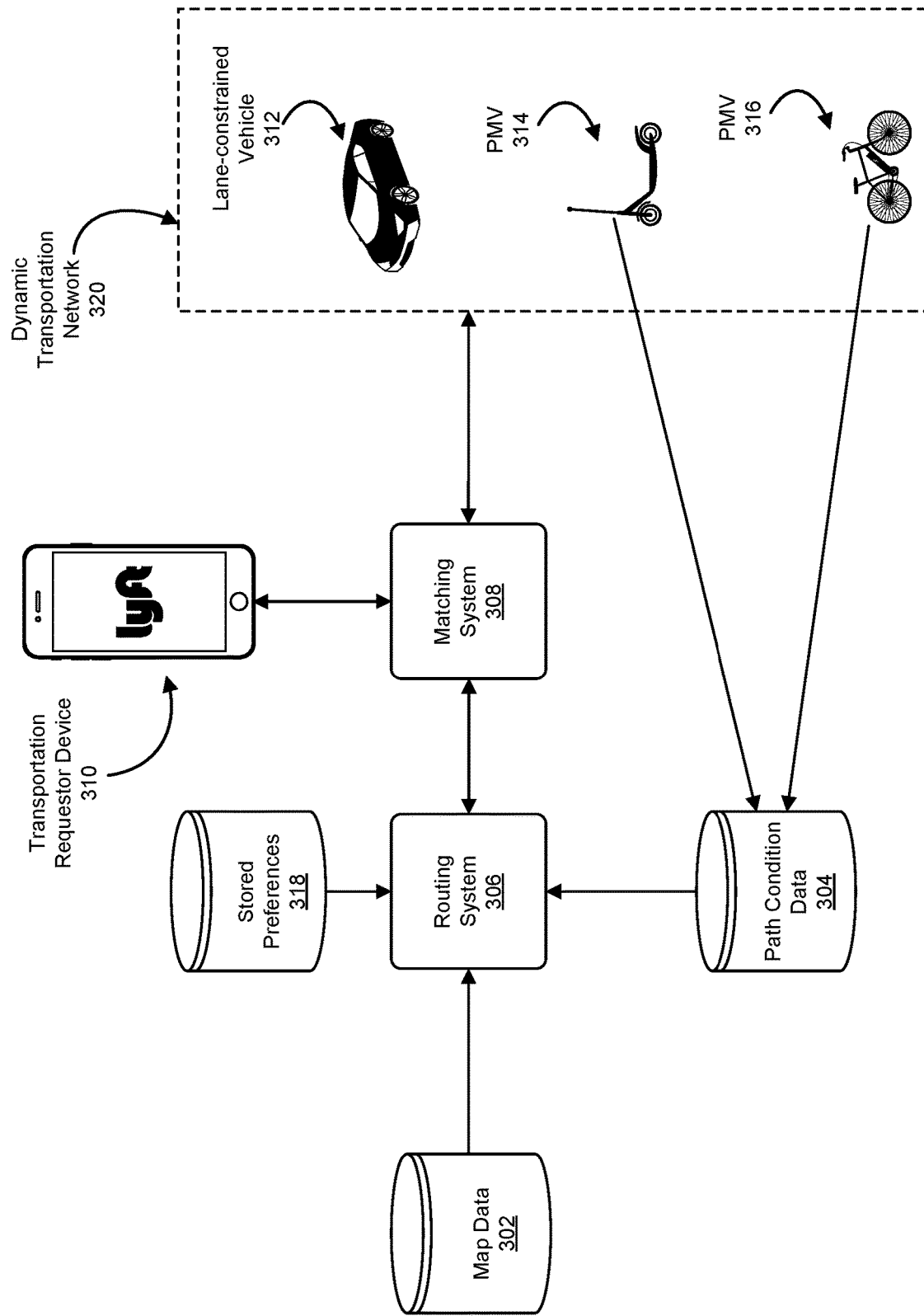
FIG. 3 is a diagram of an example system for routing personal mobility vehicles based on road conditions.

FIG. 3 is a diagram of an example system for routing PMVs based on road conditions. As illustrated in FIG. 3, a dynamic transportation matching system may include a matching system 308 and/or a routing system 306 that may communicate with one another and/or receive data from various sources. For example, matching system 308 may receive a request for transportation from a transportation requestor device 310. In one example, matching system 308 and/or routing system 306 may fulfill the request based at least partially on stored preferences 318 associated with transportation requestor device 310, map data 302 that includes data about the placement of various roads and/or other types of paths, and/or path condition data 304. In some embodiments, path condition data 304 may include data collected by PMVs within dynamic transportation network 320 that is managed by the dynamic transportation matching system. For example, PMV 314 and/or PMV 316 may collect path condition information stored in path condition data 304. In some embodiments, lane-constrained vehicle 312 may also collect path condition information (e.g., via cameras). In one example, matching system 308 may match transportation requestor device 310 with PMV 314, 316, and/or lane-constrained vehicle 312 based at least in part on path condition data 304 and/or stored preferences 318. Additionally or alternatively, routing system 306 may direct transportation requestor device 310 to traverse a specified route based at least in part on path condition data 304 and/or stored preferences 318.

Figure 4:
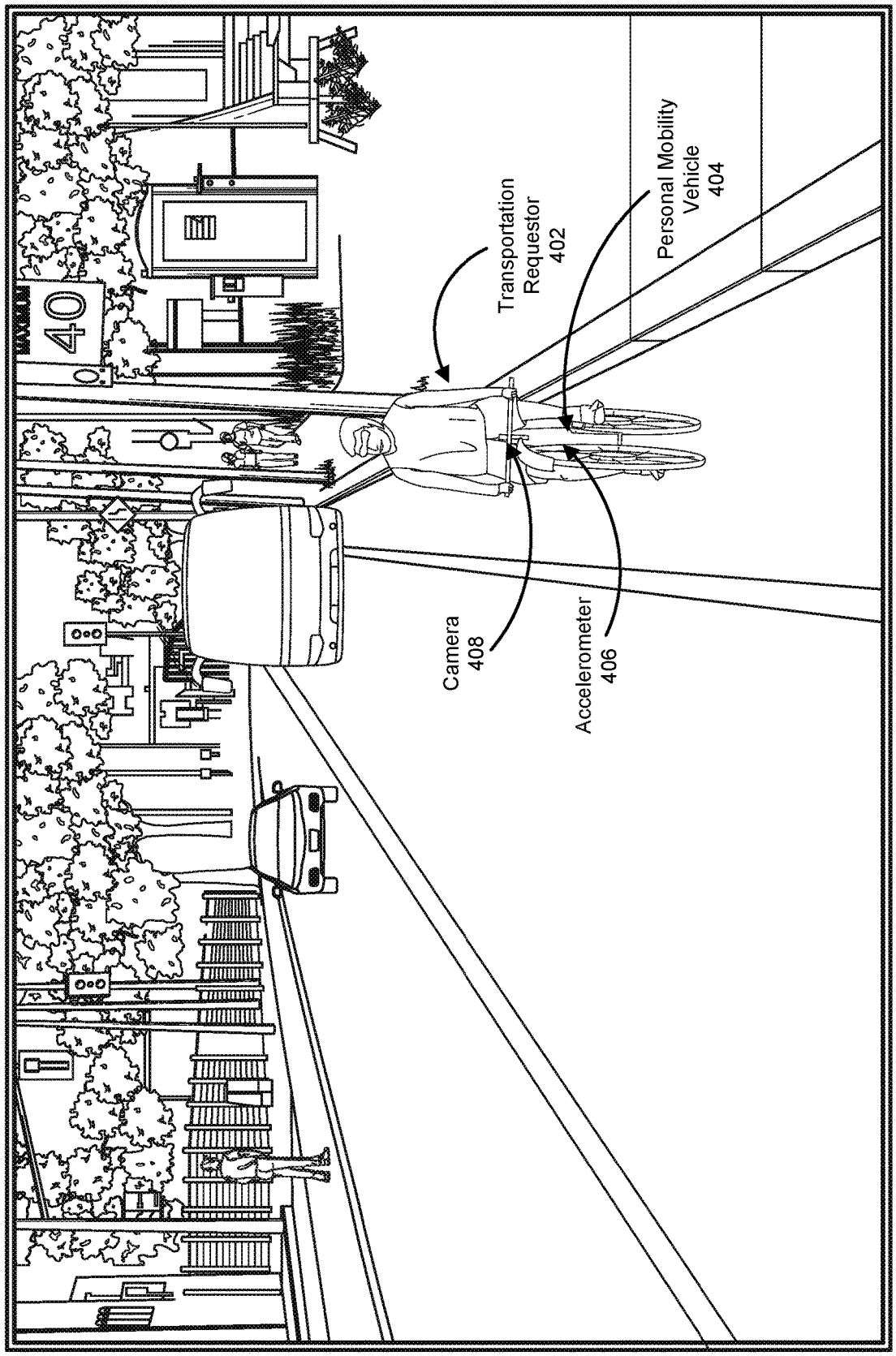
FIG. 4 is an illustration of example sensors on a personal mobility vehicle.

FIG. 4 illustrates an example PMV equipped with a variety of sensors. As illustrated in FIG. 4, a transportation requestor 402 may operate a PMV 404 during the course of a trip facilitated by a dynamic transportation matching system. In one example, PMV 404 may be equipped with a camera 408 that may capture static images and/or video of the environment surrounding PMV 404. For example, camera 408 may capture the presence or absence of a bicycle lane on a road, the width of the bicycle lane, the presence or absence of barriers, the presence and/or prevalence of obstacles (e.g., potholes), lighting conditions, and/or other conditions that may affect the safety and comfort of a transportation requestor operating a PMV. Additionally or alternatively, PMV 404 may be equipped with an accelerometer 406 that records the speed, acceleration, deceleration, and/or velocity of PMV 404. The systems described herein may use information from accelerometer 406 to determine path conditions in a variety of ways. For example, the systems described herein may determine that if accelerometer 406 records a steady, high speed, path conditions may be favorable to traversal via PMVs. In another example, if accelerometer 406 records an irregular series of stops and/or slow-downs while on a certain path, the systems described herein may determine that the path may be cluttered with obstacles. In one example, if accelerometer data shows that many PMVs passing through a specific area slow down, the systems described herein may determine that that area has some condition which makes the area unfavorable to traversal via PMVs. In some embodiments, the systems described herein may use data from other PMV sensors to determine path conditions. For example, the systems described herein may use data from a gyroscope of a PMV to determine whether the terrain of a path is bumpy. In some embodiments, the systems described herein may use data from other sources to determine path conditions. For example, the systems described herein may use vehicular accident data from a vehicular accident database to determine the safety of a particular path.

Figure 5:
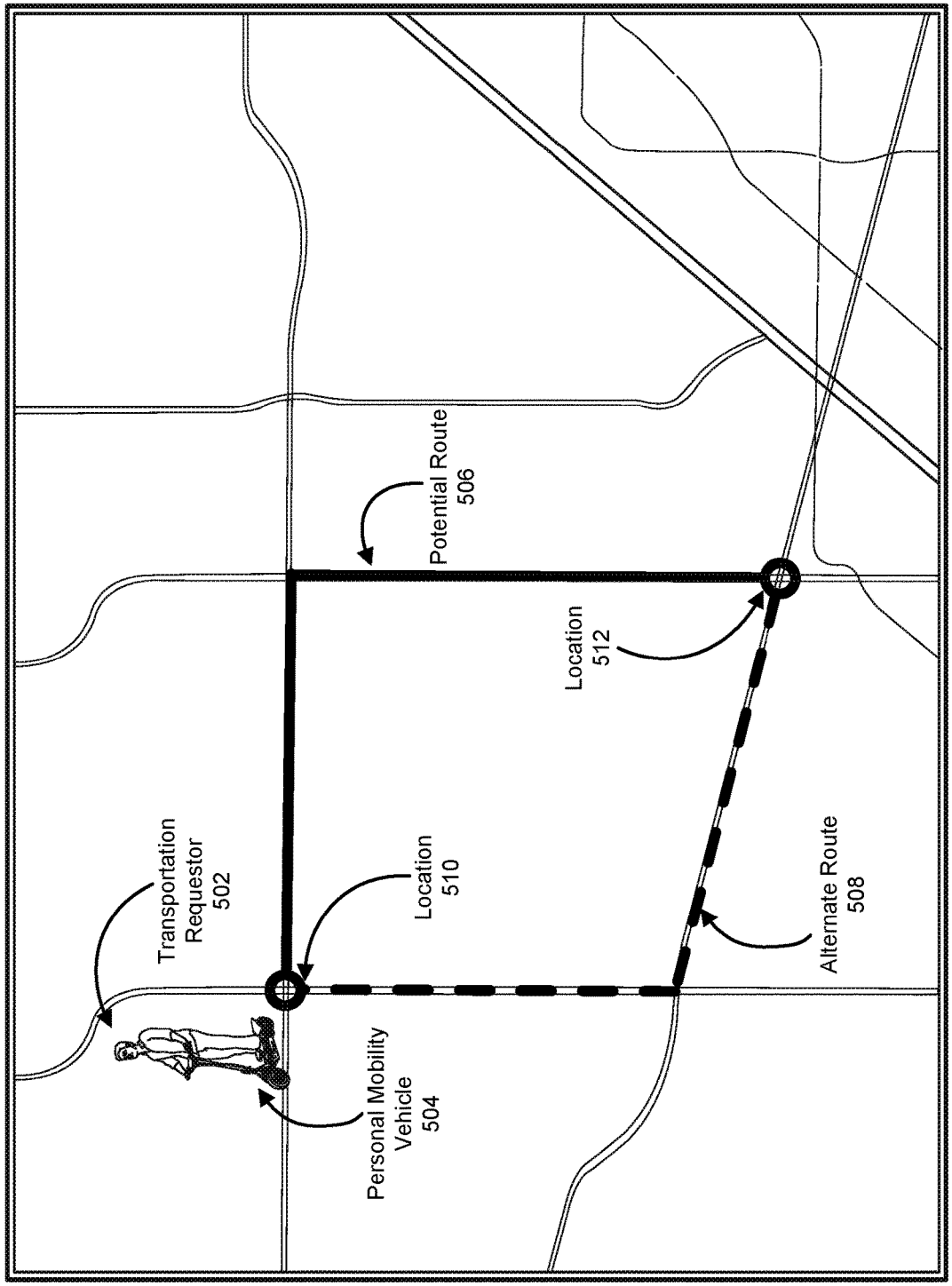
FIG. 5 is an illustration of an example map showing potential routes for a personal mobility vehicle.

FIG. 5 illustrates an example map showing potential routes for a PMV. In one example, a transportation requestor 502 may request transportation from a location 510 to a location 512. In some examples, the dynamic transportation matching system may match transportation requestor 502 with a PMV 504. In one example, a potential route 506 and an alternate route 508 may both exist between location 510 and location 512. In some examples, the systems described herein may determine that alternate route 508 includes paths with conditions more favorable to traversal via PMV 504 than potential route 506. For example, alternate route 508 may include paths with smoothly paved surfaces while potential route 506 may include paths with poorly-maintained uneven surfaces. In one example, the type of vehicle of PMV 504 may play a role in path selection. For example, if PMV 504 were a bicycle, the uneven terrain on potential route 506 may be less of a problem and the dynamic transportation matching system may select potential route 506. However, since PMV 504 is a scooter, uneven terrain may pose a significant problem and the dynamic transportation matching system may direct transportation requestor 502 to traverse alternate route 508. In some examples, the systems described herein may take current environmental conditions into account in routing and/or matching decisions. For example, alternate route 508 may be poorly lit at night, but the current trip may be taking place entirely in daylight and so the night-time lighting conditions of alternate route 508 may be irrelevant. In another example, potential route 506 may have low areas prone to flooding during rain that may only be taken into consideration by the dynamic transportation matching system during rainy weather.

Figure 6:
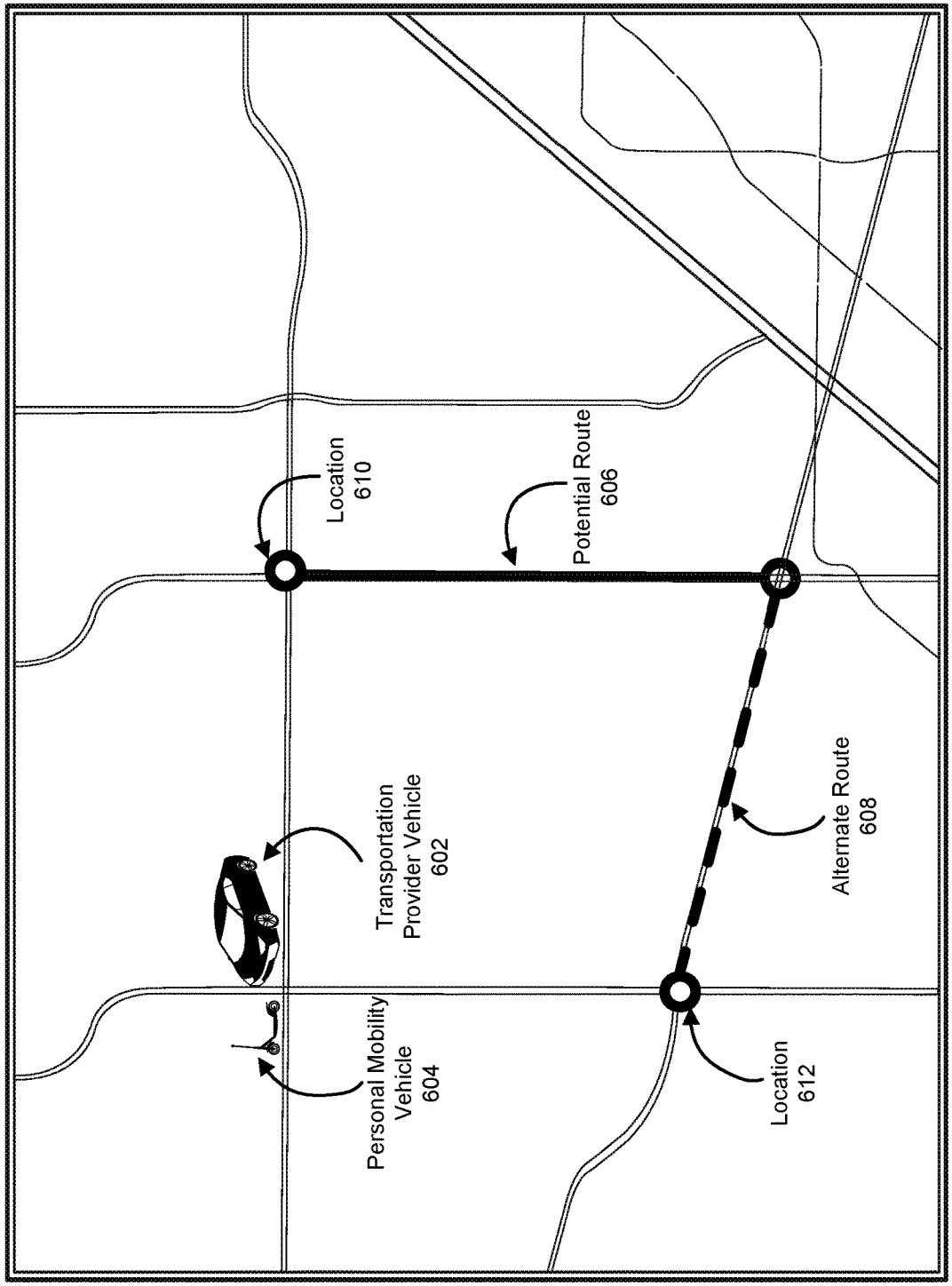
FIG. 6 is an illustration of an example map showing potential routes for a personal mobility vehicle.

FIG. 6 illustrates an example map showing potential routes for a PMV. In some examples, as illustrated in FIG. 6, a transportation provider vehicle 602 may transport a PMV 604 to a location for use in a later trip. For example, a transportation provider vehicle may position one or more PMVs near a stadium during a concert or sporting event so that after the event, departing patrons can use the PMVs to escape the snarl of traffic just outside the stadium. In some examples, a dynamic transportation matching system may direct a transportation provider vehicle to position a PMV in a certain location based on the condition of one or more paths accessible from and/or adjacent to that location. For example, a location 610 may be adjacent to a potential route 606 while a location 612 may be adjacent to an alternate route 608 that leads to the same destination. In some examples, the systems described herein may determine that potential route 606 has less favorable conditions to traversal by PMVs than alternate route 608 and may therefore direct transportation provider vehicle 602 to position PMV 604 at location 612.

Figure 7:
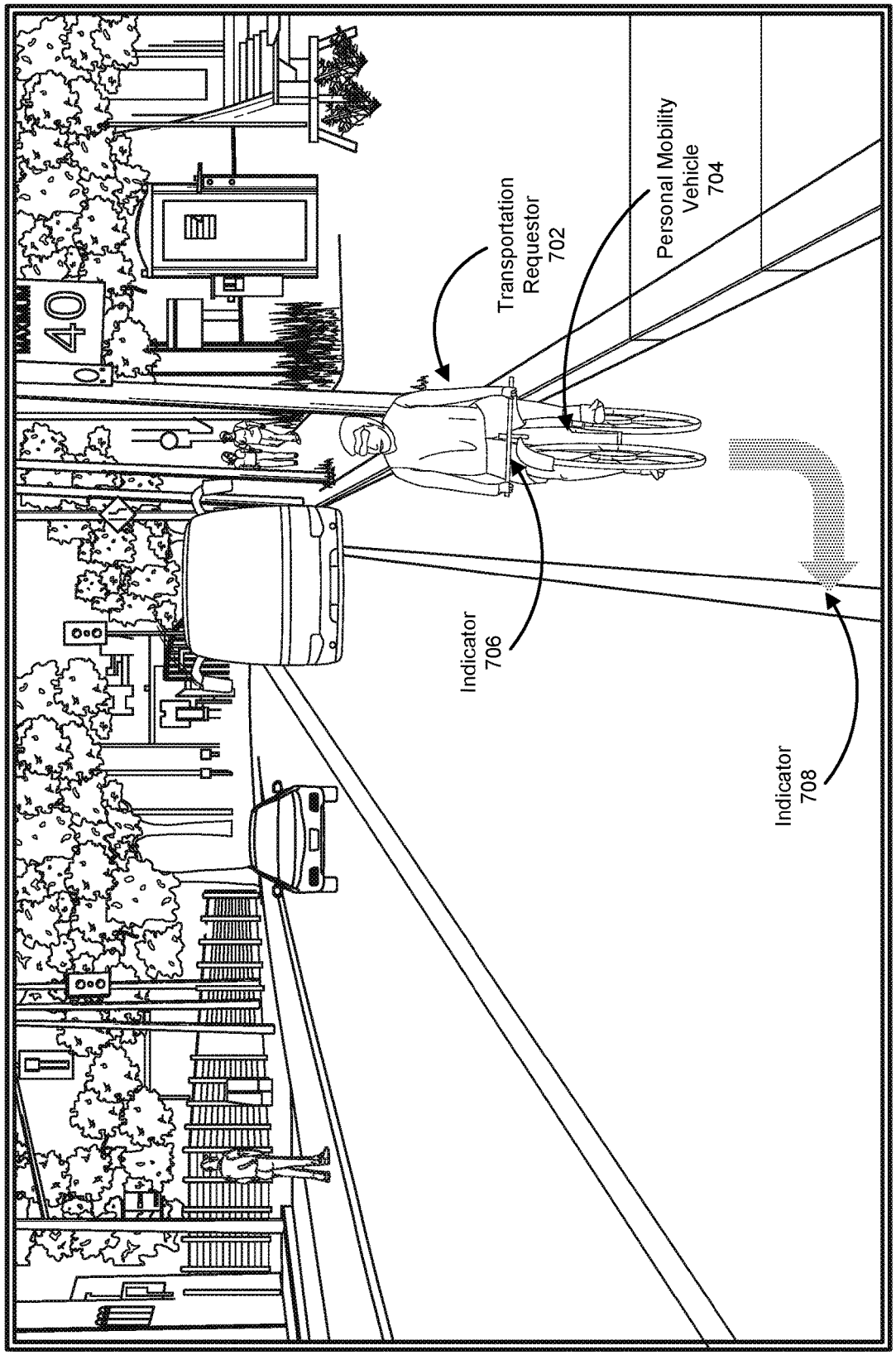
FIG. 7 is an illustration of an example personal mobility vehicle with indicator displays.

FIG. 7 illustrates an example PMV with indicator displays. In some embodiments, a dynamic transportation matching system may direct a transportation requestor to traverse a certain route by using displays and/or indicators on a PMV. For example, as illustrated in FIG. 7, a dynamic transportation matching system may direct a transportation requestor 702 to make a right turn via an indicator 706 on the handlebars of a PMV 704 and/or via an indicator 708 projected on the ground on front of PMV 704 by PMV 704. In some examples, the systems described herein may use indicators and/or other displays to direct a transportation requestor along a pre-planned route selected before the start of the trip. In other examples, the systems described herein may use indicators and/or other displays to direct a transportation requestor along a route selected during the trip. For example, if a transportation requestor diverts from the planned route during a trip, the systems described herein may select a new route based at least in part on path conditions and may then direct the transportation requestor to the new route. In another example, if conditions change during a trip, the systems described herein may select a new route based at least in part on path conditions and may then direct the transportation requestor to the new route. For example, if it begins to rain during a trip, the systems described herein may divert the transportation requestor from a path that is historically known to flood during rain and to a path that is not subject to flooding conditions.

In some examples, the systems described herein may use indicators and/or displays integrated into and/or projected from a PMV to inform a transportation requestor of other information. For example, the systems described herein may use an indicator to inform a transportation requestor that the PMV's battery is running low. In another example, the systems described herein may use an indicator to inform a transportation requestor that the transportation requestor is currently in or near a popular area and may earn points and/or receive monetary credit if the transportation requestor leaves the PMV in the popular area. In some embodiments, the systems described herein may send routing and/or other information to a transportation requestor device associated with the transportation requestor in place of and/or in addition to displaying information via the PMV.

Figure 8:
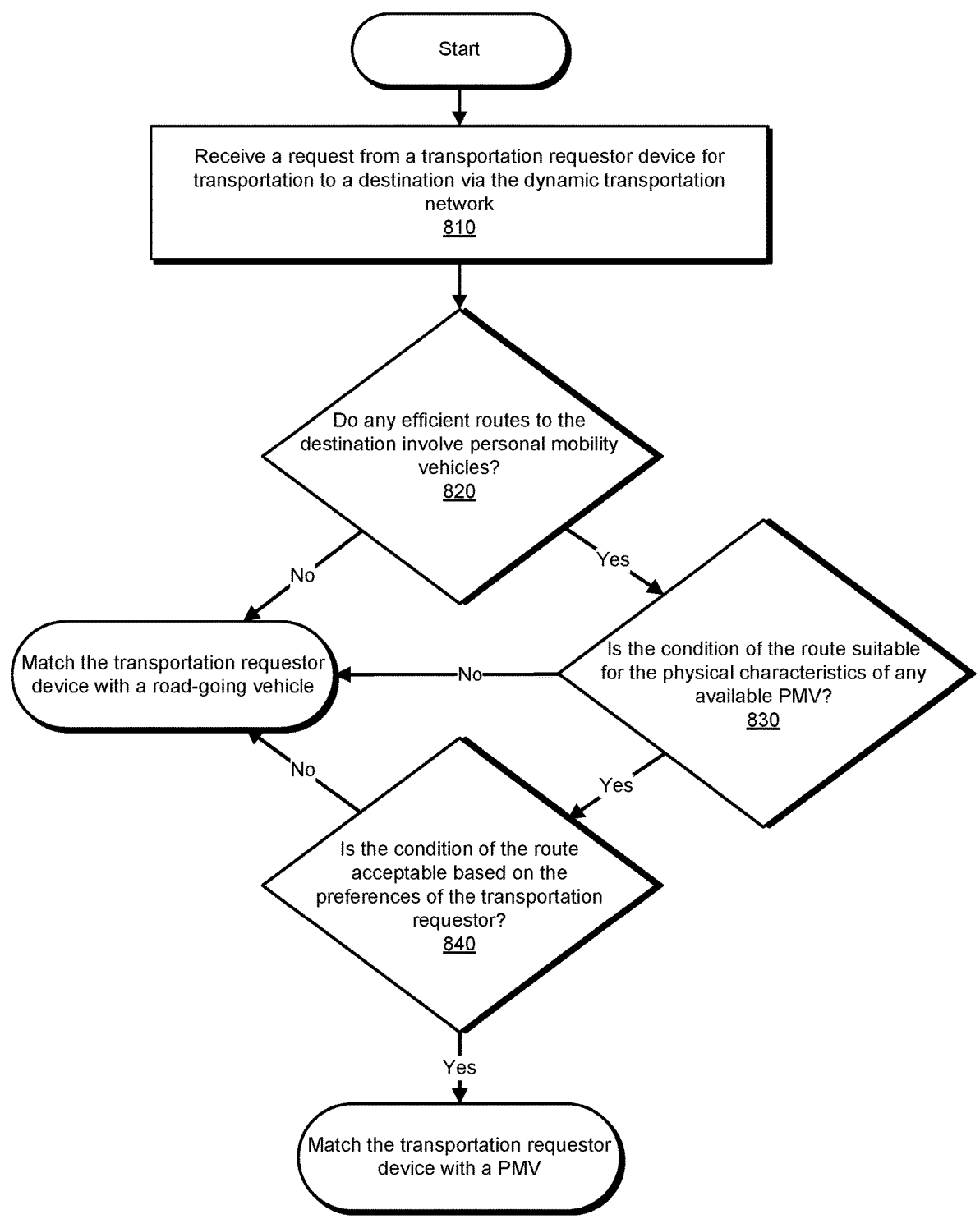
FIG. 8 is a flow diagram of an example method for routing personal mobility vehicles based on road conditions.

FIG. 8 is a flow diagram of an example decision flow for routing PMVs based on road conditions. In some examples, a dynamic transportation matching system may take into account various factors when matching a transportation requestor device with a transportation provider and/or PMV and when selecting a route for the trip. For example, at step 810, a dynamic transportation matching system may receive a request from a transportation requestor device for transportation to a destination via the dynamic transportation network. At decision point 820, the dynamic transportation matching system may determine whether any efficient routes to the destination involve a PMV. In some examples, the systems described herein may direct a transportation requestor to use a PMV to complete one leg of a trip but not for the entire trip. For example, a transportation requestor may use a PMV to travel from a downtown area with dense traffic to an area with less dense traffic where the transportation requestor may meet a lane-constrained transportation provider vehicle. In other examples, the systems described herein may direct a transportation provider to use a PMV to complete the entire trip. If no efficient routes for the trip involve a PMV, the systems described herein may match the transportation requestor device with one or more lane-constrained vehicles for the entirety of the trip.

If at least one efficient route involves a PMV, at decision point 830, the dynamic transportation matching system may determine whether the condition of the route is suitable for the characteristics of any available PMVs. For example, the route may include a steep uphill grade that is suitable for an electric scooter but not a manually-powered bicycle. In another example, the route may include a pedestrian walkway that is off-limits to bicycles but permits scooters. If the conditions of the route are suitable for at least one PMV that is available to be matched to the transportation requestor device for the trip, at decision point 840, the dynamic transportation matching system may determine whether the condition of the route is acceptable based on the preferences of the transportation requestor. For example, if the route includes roads without a bicycle lane and the transportation requestor has indicated a preference for roads with bicycle lanes, the condition of the route may not be acceptable. If the condition of the route is acceptable, the systems described herein may match the transportation requestor device with a PMV. While illustrated in an example order, the determinations made by the dynamic transportation matching system may occur in any order and/or simultaneously.

Figure 9:
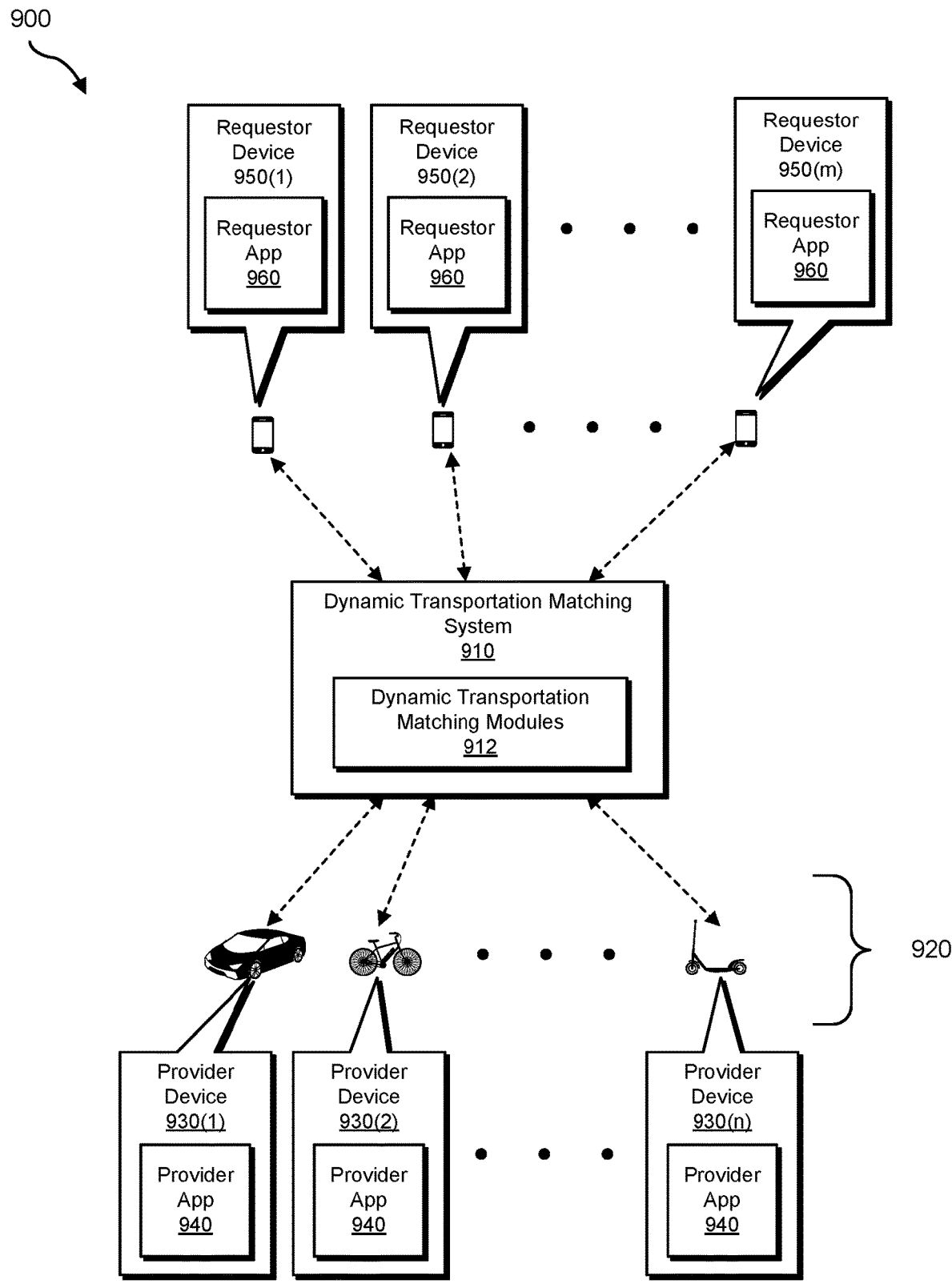
FIG. 9 is a block diagram of an example system for routing personal mobility vehicles based on road conditions.

FIG. 9 illustrates an example system 900 for matching transportation requests with a dynamic transportation network that includes personal mobility vehicles. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include lane-constrained vehicles and personal mobility vehicles. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 2 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include provider devices 930(1)-(*n*) (e.g., whether integrated into the vehicle, permanently affixed to the vehicle, temporarily affixed to the vehicle, worn by a driver of the vehicle, etc.). In some examples, provider devices 930 may include a provider app 940. Provider app 940 may represent any application, program, and/or module that may provide one or more services related to operating a vehicle and/or providing transportation matching services. For example, provider app 940 may include a transportation matching application for providers. In some examples, provider application 940 may match the user of provider app 940 (e.g., a transportation provider) with transportation requestors through communication with dynamic transportation matching system 910. In addition, and as is described in greater detail below, provider app 940 may provide dynamic transportation management system 910 with information about a provider (including, e.g., the current location of the provider) to enable dynamic transportation management system 910 to provide dynamic transportation matching and/or management services for the provider and one or more requestors. In some examples, provider app 940 may coordinate communications and/or a payment between a requestor and a provider. According to some embodiments, provider app 940 may provide a map service, a navigation service, a traffic notification service, and/or a geolocation service.

Additionally, as shown in FIG. 9, dynamic transportation matching system 910 may communicate with requestor devices 950(1)-(m). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 10:
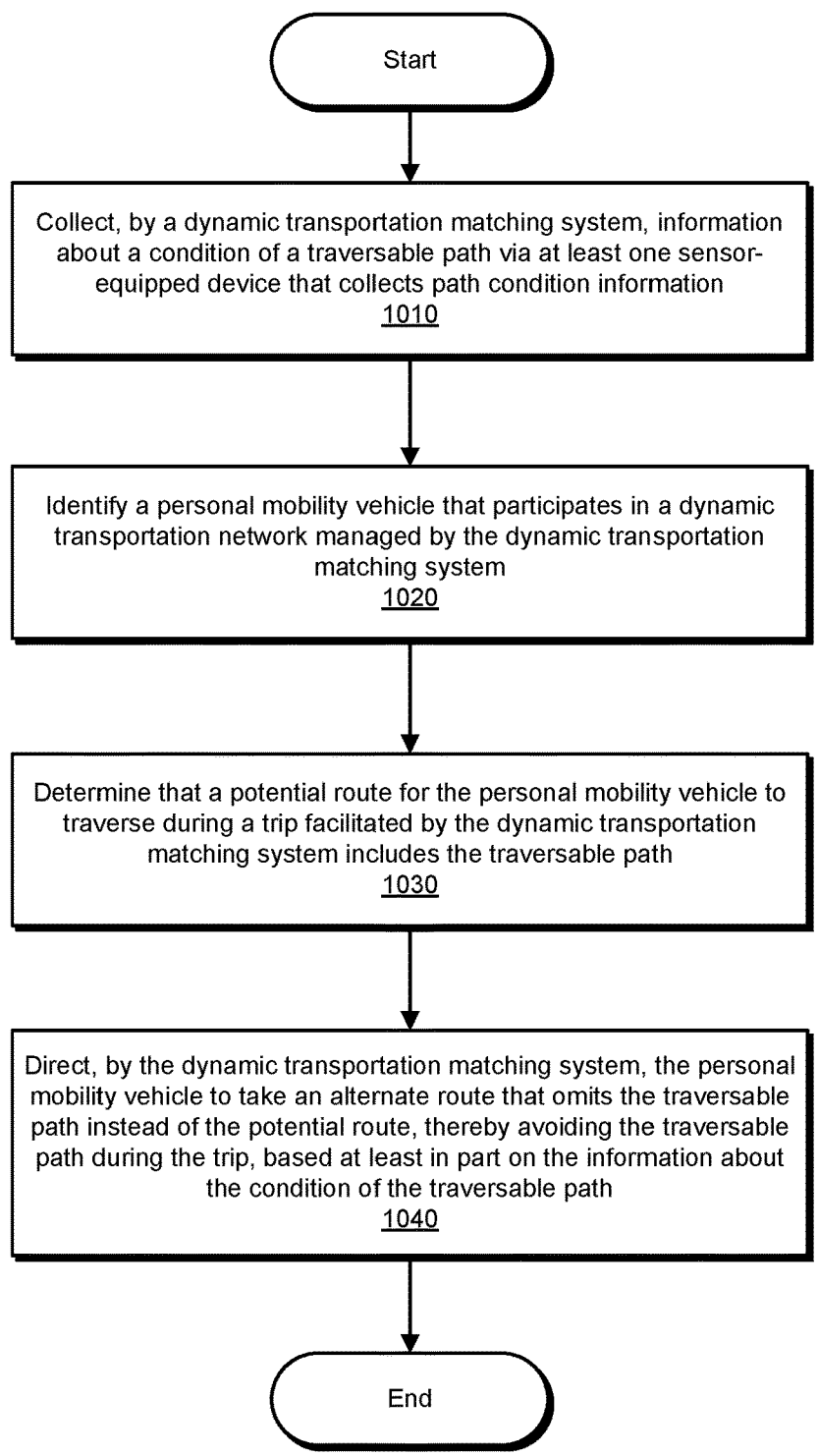
FIG. 10 is a flow diagram of an example method for routing personal mobility vehicles based on road conditions.

FIG. 10 illustrates an example method 1000 for determining allocation of personal mobility vehicles. As illustrated in FIG. 10, at step 1010, one or more of the systems described herein may collect, by a dynamic transportation matching system, information about a condition of a traversable path via at least one sensor-equipped device that collects path condition information.

In one embodiment the dynamic transportation matching system may collect the information about the condition of the traversable path via at least one sensor-equipped personal mobility vehicle that participates in the dynamic transportation network. In some examples, the systems described herein may collect the information about the condition of the traversable path via the sensor-equipped personal mobility vehicle that participates in the dynamic transportation network by collecting data from an accelerometer of the additional personal mobility vehicle. Additionally or alternatively, the systems described herein may collect the information about the condition of the traversable path via the sensor-equipped personal mobility vehicle that participates in the dynamic transportation network by collecting data from a camera of the additional personal mobility vehicle.

In some examples, the information about the condition of the traversable path may include information about the safety of the traversable path for traversal by personal mobility vehicles. In one examples, the traversable path may include a designated road lane for personal mobility vehicles and the information about the condition of the traversable path may include information about the width of the designated road lane and/or a physical separation between the designated road lane and a road lane designated for lane-constrained vehicles. In one example, the information about the condition of the traversable path may include information about the physical surface of the traversable path.

At step 1020, one or more of the systems described herein may identify a personal mobility vehicle that participates in a dynamic transportation network managed by the dynamic transportation matching system.

At step 1030, one or more of the systems described herein may determine that a potential route for the personal mobility vehicle to traverse during a trip facilitated by the dynamic transportation matching system may include the traversable path.

At step 1040, one or more of the systems described herein may direct, by the dynamic transportation matching system, a device associated with the personal mobility vehicle to take an alternate route that omits the traversable path instead of the potential route, thereby avoiding the traversable path during the trip, based at least in part on the information about the condition of the traversable path.

In one embodiment, the dynamic transportation matching system may direct the device associated with the personal mobility vehicle to take the alternate route that omits the traversable path instead of the potential route by collecting information about a condition of an additional traversable path, where the alternate route includes the additional traversable path and directing the device associated with the personal mobility vehicle to take the alternate route during the trip based at least in part on the information about the condition of the additional traversable path. In one embodiment the dynamic transportation matching system may direct the device associated with the personal mobility vehicle to take the alternate route path during the trip by directing a transportation requestor device to traverse the additional traversable path during the trip via the personal mobility vehicle rather than directing the transportation requestor device to an alternate mode of transportation for the trip.

In some examples, the dynamic transportation matching system may direct the device associated with the personal mobility vehicle to take the alternate route that omits the traversable path instead of the potential route, thereby avoiding the traversable path during the trip by directing the device associated with the personal mobility vehicle to avoid the traversable path based at least in part on a physical characteristic of the personal mobility vehicle. Additionally or alternatively, the dynamic transportation matching system may direct the device associated with the personal mobility vehicle to take the alternate route that omits the traversable path instead of the potential route, thereby avoiding the traversable path during the trip by directing the device associated with the personal mobility vehicle to avoid the traversable path based at least in part on a stored path-condition preference of a transportation requestor currently operating the personal mobility vehicle.

In one embodiment, the dynamic transportation matching system may direct the device associated with the personal mobility vehicle to take an alternate route that omits the traversable path instead of the potential route, thereby avoiding the traversable path during the trip by placing the personal mobility vehicle at a location near the alternate route rather than at a location near the potential route in advance of usage of the personal mobility vehicle during the trip by sending a message to a transportation requestor device that directs a transportation requestor to transport the personal mobility vehicle to the location near the alternate route and/or sending a message to a transportation provider device that directs a transportation provider to transport the personal mobility vehicle to the location near the alternate route via an additional vehicle. Additionally or alternatively, the dynamic transportation matching system may direct the device associated with the personal mobility vehicle to take the alternate route that omits the traversable path instead of the potential route by activating a display feature of the personal mobility vehicle to direct a current operator of the personal mobility vehicle to traverse the alternate traversable path.

Figure 11:
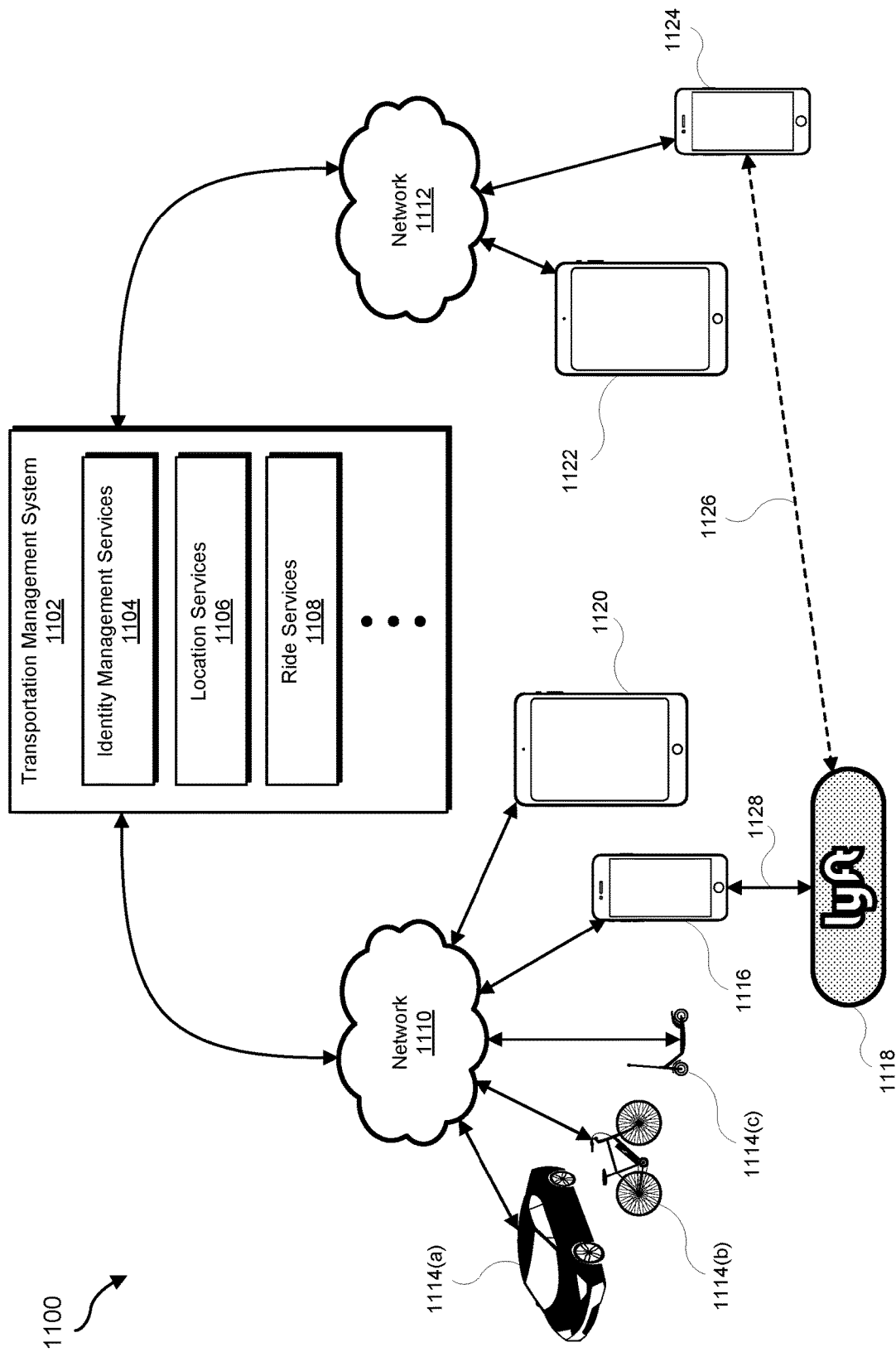
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(a), 1114(b), and/or 1114(c); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services module 1104 has authenticated the identity a ride requestor, ride services module 1108 may attempt to match the requestor with one or more ride providers. In some embodiments, ride services module 1108 may identify an appropriate provider using location data obtained from location services module 1106. Ride services module 1108 may use the location data to identify providers who are geographically close to the requestor (e.g., within a certain threshold distance or travel time) and/or who are otherwise a good match with the requestor. Ride services module 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.11 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 902.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
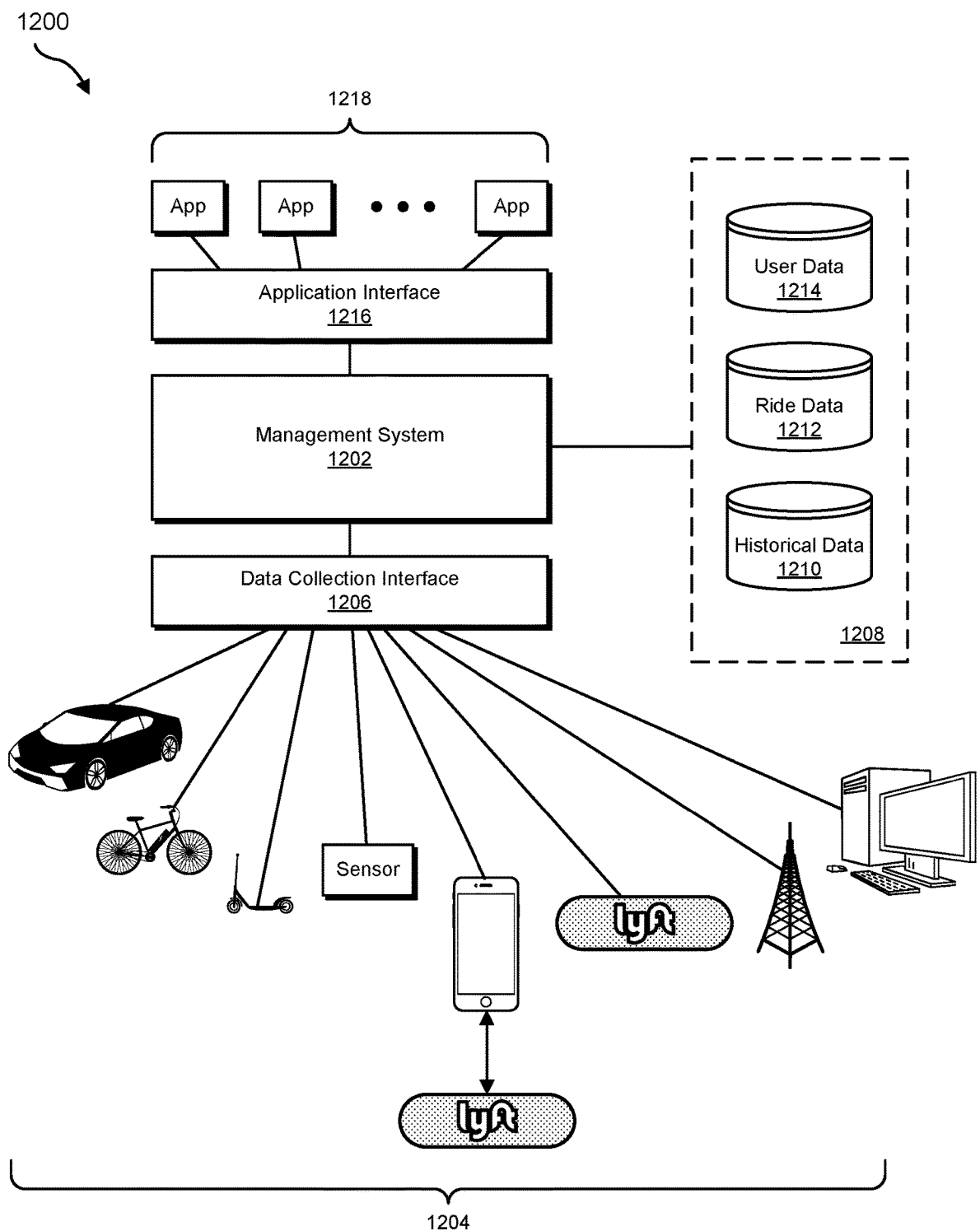
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    collecting, by a dynamic transportation matching system, information about a physical condition of a traversable path via at least one sensor-equipped device;
    identifying, by the dynamic transportation matching system, a personal mobility vehicle that participates in a fleet of personal mobility vehicles managed by the dynamic transportation matching system, wherein the fleet of personal mobility vehicles comprises different types of personal mobility vehicles;
    determining, by the dynamic transportation matching system, a potential route including the traversable path for the personal mobility vehicle to traverse during a trip that is facilitated by the dynamic transportation matching system;
    determining, by the dynamic transportation matching system, to direct the personal mobility vehicle to traverse an alternate route instead of the potential route based on a type of the personal mobility vehicle; and
    directing, by the dynamic transportation matching system, a device associated with the personal mobility vehicle to traverse the alternate route instead of traversing the potential route, thereby avoiding the traversable path during the trip, based at least in part on the information about the physical condition of the traversable path and the type of the personal mobility vehicle to improve an allocation of the fleet of personal mobility vehicles.

2. The computer-implemented method of claim 1, wherein the information about the physical condition of the traversable path comprises information about a safety of the traversable path for traversal by personal mobility vehicles, and wherein the different types of the personal mobility vehicles include electric bicycles and electric scooters.

3. The computer-implemented method of claim 1, wherein directing, by the dynamic transportation matching system, the device associated with the personal mobility vehicle to traverse the alternate route instead of the potential route comprises:
    collecting, by the dynamic transportation matching system, information about a physical condition of an additional traversable path, wherein the alternate route comprises the additional traversable path; and
    directing, by the dynamic transportation matching system, the device associated with the personal mobility vehicle to traverse the alternate route during the trip based at least in part on the information about the physical condition of the additional traversable path.

4. The computer-implemented method of claim 3, wherein directing, by the dynamic transportation matching system, the device associated with the personal mobility vehicle to traverse the alternate route during the trip comprises directing a transportation requester device to traverse the additional traversable path during the trip via the personal mobility vehicle rather than directing the transportation requester device to an alternate mode of transportation for the trip.

5. The computer-implemented method of claim 1, wherein the collecting, by the dynamic transportation matching system, the information about the physical condition of the traversable path via the at least one sensor-equipped device comprises collecting the information about the physical condition of the traversable path via at least one sensor-equipped personal mobility vehicle that participates in the fleet.

6. The computer-implemented method of claim 5, wherein the collecting the information about the physical condition of the traversable path via the at least one sensor-equipped personal mobility vehicle that participates in the fleet comprises collecting data from an accelerometer of the at least one sensor-equipped personal mobility vehicle.

7. The computer-implemented method of claim 5, wherein the collecting the information about the physical condition of the traversable path via the at least one sensor-equipped personal mobility vehicle that participates in the fleet comprises collecting data from a camera of the at least one sensor-equipped personal mobility vehicle.

8. The computer-implemented method of claim 1, wherein directing, by the dynamic transportation matching system, the device associated with the personal mobility vehicle to traverse the alternate route instead of the potential route during the trip comprises directing the device associated with the personal mobility vehicle to avoid the traversable path based at least in part on a physical characteristic of the personal mobility vehicle.

9. The computer-implemented method of claim 1, wherein directing, by the dynamic transportation matching system, the device associated with the personal mobility vehicle to traverse the alternate route instead of the potential route during the trip comprises directing the device associated with the personal mobility vehicle to avoid the traversable path based at least in part on a stored path condition preference of a transportation requester currently operating the personal mobility vehicle.

10. The computer-implemented method of claim 1, wherein directing, by the dynamic transportation matching system, the device associated with the personal mobility vehicle to traverse the alternate route instead of the potential route during the trip comprises placing the personal mobility vehicle at a location near the alternate route rather than at a location near the potential route in advance of usage of the personal mobility vehicle during the trip by at least one of:
    sending a message to a transportation requester device that directs a transportation requester to transport the personal mobility vehicle to the location near the alternate route; or
    sending a message to a transportation provider device that directs a transportation provider to transport the personal mobility vehicle to the location near the alternate route via an additional vehicle.

11. The computer-implemented method of claim 1, wherein directing, by the dynamic transportation matching system, the device associated with the personal mobility vehicle to traverse the alternate route instead of the potential route comprises activating a display feature of the personal mobility vehicle to direct a current operator of the personal mobility vehicle to traverse the alternate route.

12. The computer-implemented method of claim 1, wherein:

the traversable path comprises a designated road lane for personal mobility vehicles; and the information about the physical condition of the traversable path comprises information about at least one of a width of the designated road lane or a physical separation between the designated road lane and a road lane designated for lane-constrained vehicles.

13. The computer-implemented method of claim 1, wherein the information about the physical condition of the traversable path comprises information about a physical surface of the traversable path.

14. A dynamic transportation matching system comprising:

a non-transitory memory; and one or more hardware processors coupled to the non-transitory memory and configured to read instructions from the non-transitory memory to cause the dynamic transportation matching system to perform operations comprising:

collecting information about a physical condition of a traversable path via at least one sensor-equipped device;

identifying a personal mobility vehicle that participates in a fleet of personal mobility vehicles managed by the dynamic transportation matching system, wherein the fleet of personal mobility vehicles comprises different types of personal mobility vehicles;

determining a potential route including the traversable path for the personal mobility vehicle to traverse during a trip that is facilitated by the dynamic transportation matching system;

determining to direct the personal mobility vehicle to traverse an alternate route instead of the potential route based on a type of the personal mobility vehicle; and directing a device associated with the personal mobility vehicle to traverse the alternate route instead of the potential route, thereby avoiding the traversable path during the trip, based at least in part on the information about the physical condition of the traversable path and the type of the personal mobility vehicle to improve an allocation of the fleet of personal mobility vehicles.

15. The dynamic transportation matching system of claim 14, wherein the information about the physical condition of the traversable path comprises information about a safety, including a lighting condition, of the traversable path for traversal by personal mobility vehicles, and wherein the different types of the personal mobility vehicles include electric bicycles and electric scooters.

16. The dynamic transportation matching system of claim 14, wherein the directing is performed by:

collecting information about a physical condition of an additional traversable path, wherein the alternate route comprises the additional traversable path; and directing the device associated with the personal mobility vehicle to traverse the alternate route during the trip based at least in part on the information about the physical condition of the additional traversable path.

17. The dynamic transportation matching system of claim 16, wherein the directing the device associated with the personal mobility vehicle to traverse the alternate route during the trip is performed by directing a transportation requester device to traverse the additional traversable path during the trip via the personal mobility vehicle rather than directing the transportation requester device to an alternate mode of transportation for the trip.

18. The dynamic transportation matching system of claim 14, wherein the collecting is performed by collecting the information about the physical condition of the traversable path via at least one sensor-equipped personal mobility vehicle that participates in the fleet.

19. The dynamic transportation matching system of claim 18, wherein the collecting the information about the physical condition of the traversable path via the at least one sensor-equipped personal mobility vehicle that participates in the fleet is performed by collecting data from an accelerometer of the at least one sensor-equipped personal mobility vehicle.

20. A non-transitory computer-readable storage medium comprising:

computer-readable instructions that, when executed by at least one processor of a computing device, cause the computing device to:

collect information about a physical condition of a traversable path via at least one sensor-equipped device;

identify a personal mobility vehicle that participates in a fleet of personal mobility vehicles managed by a dynamic transportation matching system, wherein the fleet of personal mobility vehicles comprises different types of personal mobility vehicles;

determine a potential route including the traversable path for the personal mobility vehicle to traverse during a trip that is facilitated by the dynamic transportation matching system;

determining to direct the personal mobility vehicle to traverse an alternate route instead of the potential route based on a type of the personal mobility vehicle; and direct a device associated with the personal mobility vehicle to traverse the alternate route instead of the potential route, thereby avoiding the traversable path during the trip, based at least in part on the information about the physical condition of the traversable path and the type of the personal mobility vehicle to improve an allocation of the fleet of personal mobility vehicles.

\* \* \* \* \*